United States Patent [19]
Morse et al.

[11] Patent Number: 5,820,911
[45] Date of Patent: Oct. 13, 1998

[54] FOOD EXTRUSION PUMP SYSTEM

[75] Inventors: Charles H. Morse; Robert Reed Harrison, both of Beverly, Mass.

[73] Assignee: Pearce Processing Sustems, Gloucester, Mass.

[21] Appl. No.: 620,128

[22] Filed: Mar. 21, 1996

[51] Int. Cl.⁶ .................................. A22C 7/00; A23P 1/00
[52] U.S. Cl. .................. 426/516; 425/376.1; 425/382 R; 425/464; 426/512
[58] Field of Search ..................................... 426/516, 512, 426/513; 425/376.1, 382 R, 464

[56] References Cited

U.S. PATENT DOCUMENTS

| | | | |
|---|---|---|---|
| 3,547,050 | 12/1970 | Verhoven | 107/27 |
| 3,797,069 | 3/1974 | Von Lersner et al. | 17/32 |
| 3,857,989 | 12/1974 | King | 426/518 |
| 4,268,532 | 5/1981 | Bernard | 426/516 |
| 4,614,489 | 9/1986 | Juravic | 425/376 R |
| 4,708,055 | 11/1987 | Matsumoto et al. | 425/376.1 |

*Primary Examiner*—George Yeung
*Attorney, Agent, or Firm*—Don Halgren

[57] ABSTRACT

The present invention comprises a foodstuff processing assembly for the continuous, uniform flow per unit time discharge of a foodstuff onto a moveable conveyor belt, the assembly comprising a support frame for supportively holding the pump assembly. A plurality of split pump housings are disposed transversely with respect to the conveyor belt. An upper drive shaft rotates a plurality of gears within each of the spilt pump housing portions. A lower support shaft rotatably supports corresponding lower array of gear teeth within those split pump housings. The input chambers are arranged in communication with a common manifold, and a plurality of nozzles are disposed in a forward portion of each of the split pump housing sections. A pressurized foodstuff containment vessel is in communication through a manifold into each of the input chambers feeding the split pump housing members.

16 Claims, 6 Drawing Sheets

FOOD EXTRUSION PUMP SYSTEM

BACKGROUND OF THE INVENTION

1. Field of the Invention

This invention relates to food processing machines, and more particularly to pumps for processing multiple streams of extruded food.

2. Prior Art

The productions of foodstuffs for disposition onto a moving conveyor belt has been done for many years. For example, U.S. Pat. No. 3,547,050 to Verhoven shows a dough depositing machine for cookies, wherein dough was pushed out through a nozzle from a hopper onto a cookie pan on a conveyor belt. U.S. Pat. No. 3,797,069 to VonLersner et al shows a extrusion apparatus for depositing spherically shaped food products on a conveyor belt, by means of a reciprocally moving plate which is in the discharge orifice of a food or supply line. Multiple discrete mounds of food may therefore be deposited upon a moving conveyor belt.

U.S. Pat. No. 3,857,989 to King shows a machine for preparing an animal food product, wherein a chamber has a plunger, which chamber is fed by an animal mass which when filled, and the plunger reciprocates, the food is extruded the plate under pressure to form a plurality of homogeneous pellet-like products.

U.S. Pat. No. 4,614,489 to Juravic shows a machine for the simultaneous extrusion of multiple streams of fibrous food from a single pressurized chamber. A plurality of nozzles are disposed above a moving conveyor belt, which is utilized to extrude endless line of food product streams on the conveyor belt.

The prior art has not been able to commercially develop an extrusion system which has no pressure differential across a plurality of nozzles, which unfortunately produces a poor stream of food on a moving conveyor belt therebeneath.

It is an object of the present invention to provide a multiple nozzle food extrusion arrangement wherein there is no pressure differential between nozzles spaced across the moving conveyor belt.

It is a further object of the present invention to overcome the disadvantages of the prior art whose deposition of food onto the conveyor belt may not be uniform nor homogeneous, but to be able to produce a constant weight of extrudate per unit of time, from each of a plurality of nozzles.

BRIEF SUMMARY OF THE INVENTION

The present invention comprises a multiple pump arrangement for the processed extrusion of foodstuffs such as fish mash, ground beef, potatoes, cookie dough or the like. The processing arrangement comprises a plurality of positive displacement pumps mounted along side one another in a ganged fashion, controlled and/or powered by a common power drive or source.

Each pump comprises a first or upper rotatable gear and a second or lower rotatable gear, each upper gear being mounted on a common horizontally disposed drive shaft and each lower gear being disposed on a common lower shaft, the upper shaft driving both sets of gears by virtue of their mating rotative interengagement. Each set of gears disposed on the upper and lower shaft, are rotatably supportively disposed within a split pump housing.

The split pump housing comprises a generally cylindrically shaped upper chamber through which the upper drive shaft and upper gears are located in a close fitting relationship. The lower gears are correspondingly located in a lower generally cylindrically shaped chamber within the lower portion of the split pump housing, in a close fitting relationship therewith. The split pump housing has a forward portion and a rearward portion, which when joined together define those cylindrically shaped chambers which enclose the rotatably supportive gears therewithin.

The forward portion of the split pump housing has a plurality of discharge nozzles spaced there across. There is at least one nozzle for each upper and lower gear arrangement. In the rearward side of the split pump housing, there is a food feed conduit in communication therewith. A food feed conduit acts as a supply channel for several pairs of upper and lower gear arrangements which pump the feed from the conduit and out through each respective extrusion nozzle on the front or forward portion of the split pump housing.

Each food feed conduit is supplied by a food feed manifold, which manifold is in communication with a pressurized foodstuff containment chamber. The pressurized foodstuff containment chamber causes foodstuff to be pressed through a plurality of conduits defining the manifold, which splits into further conduits each conduit supplying a mass feed conduit as discussed hereinabove.

In one embodiment of the present invention, a dividing element is disposed within the mash feed conduit, so as to split the mash feed foodstuff onto the outer peripheral teeth of both of the upper end the lower gears respectively. As the meshing gears rotate, they carry the foodstuff with them between adjacent teeth of the respective gears. As the teeth rotate through an arc of about 270 degrees, they mesh and thus force the foodstuff from between the adjacent teeth and out the nozzle there adjacent. Since the feed manifold receives the foodstuffs in a pressurized manner, the spaces between the adjacent teeth are filled with foodstuff to be squeezed out the nozzle. One other aspect of the present invention comprises the split pump housing, having its forward portions being mounted on a bushing at each lower end thereof, each bushing being mounted on a horizontally disposed support shaft, on the frame of the foodstuff processing assembly.

The rearward path of the split pump housing is similarly mounted by a lowermost support bushing at each end thereof, on the same horizontally disposed Support shaft. The upper and lower gang of gears, being the driving mechanism for the foodstuff ejected from each respective nozzle, is independently supported on their common upper drive shaft and lower drive shaft by spaced apart support columns attached to the frame assembly, each shaft being rotatably journalled thereon.

By virtue of their separability of the forward and rearward portions of the split pump housing, the upper and lower chambers of each pump portion may be inspected and readily cleaned, as well as the upper and lower intermeshing gears and nozzles which extrude the foodstuff itself. Alignment pins disposed on the support columns for the upper and lower shafts, made with corresponding alignment holes in the adjacent faces of the forward and rearward portions of the split pump housing, to ensure proper alignment when the split pump housing is reassembled into one mating unit.

The nozzles discharge the extrudate foodstuff onto a moving conveyor belt supported downstream of the split pump housing assembly. The conveyor belt may be chilled by a refrigerant or cold air discharge between the upper and lower surfaces of the belt or by a cooling jet of air upon the extrudate as it is deposited upon the moving belt.

A cylindrically shaped rotatable cutting drum may be disposed downstream of the discharge nozzle arrangement, over a portion of the conveyor belt. The drum has a plurality of radially directed knife blades extending therefrom. Each knife blade is spaced a specific arcuate or circumferential distance from its adjacent neighboring knife blade, so as to cut into finite length the streams of foodstuff extrudate passing on the conveyor belt therebeneath.

The invention comprises a foodstuff processing assembly for the uniform and continuous discharge of a foodstuff from a plurality of nozzles, including a frame supporting a plurality of foodstuff pumps, a common drive shaft for empowering each of the plurality of pumps, a motor unit for empowering the common drive shaft, a manifold for supplying the pumps with foodstuff for subsequent pumping thereof, a pressurized foodstuff source in communication with the pumps through the manifold, to supply foodstuffs under pressure to the plurality of pumps, to permit foodstuffs to be uniformly extruded from the pumps through the arrangement of nozzles. Each of the pumps has a nozzle in downstream communication therewith, to extrude foodstuff therefrom. Each of the pumps are supported in a housing, the housing being splittable so as to permit access and cleaning thereof. A conveyor is arranged beneath the nozzles for receipt of extruded foodstuff thereon. A cutting mechanism is supported over said conveyor belt to cut the elongated extruded foodstuff thereon into shorter segments.

The invention also includes a method of extruding a plurality of uniform, consistent elongated lines of foodstuff onto a conveyor belt, comprising the steps of supporting a plurality of pump members on a frame adjacent the conveyor belt, arranging a nozzle in a housing of each of the pump members from which to discharge the foodstuff, empowering each of the pumps by a common drive mechanism, and supplying each of the pumps with a manifold in communication with a foodstuff source. The method includes the steps of pressurizing the foodstuff source so as to supply foodstuff to the pumps through the manifold under a common uniform pressure, and opening a middle portion of the housing of the pump members to permit the cleaning and repair of the common drive mechanism and any internal components therein.

Thus the present invention involves the use of a single power source to empower the pumping of foodstuffs such as a fish mash, potato, meat or cookie dough from a pressurized containment vessel through a feed conduit, to permit a continuous, uniform discharge of extruded foodstuffs through corresponding multiple pump and nozzle arrangements, thereby permitting that homogeneous and uniform presentation of foodstuff onto a moveable conveyor belt thereadjacent.

BRIEF DESCRIPTION OF THE DRAWINGS

The objects and advantages of the present invention will become more apparent, when viewed in conjunction with the following drawings in which.

DESCRIPTION OF THE PREFERRED EMBODIMENTS

Figure 1:
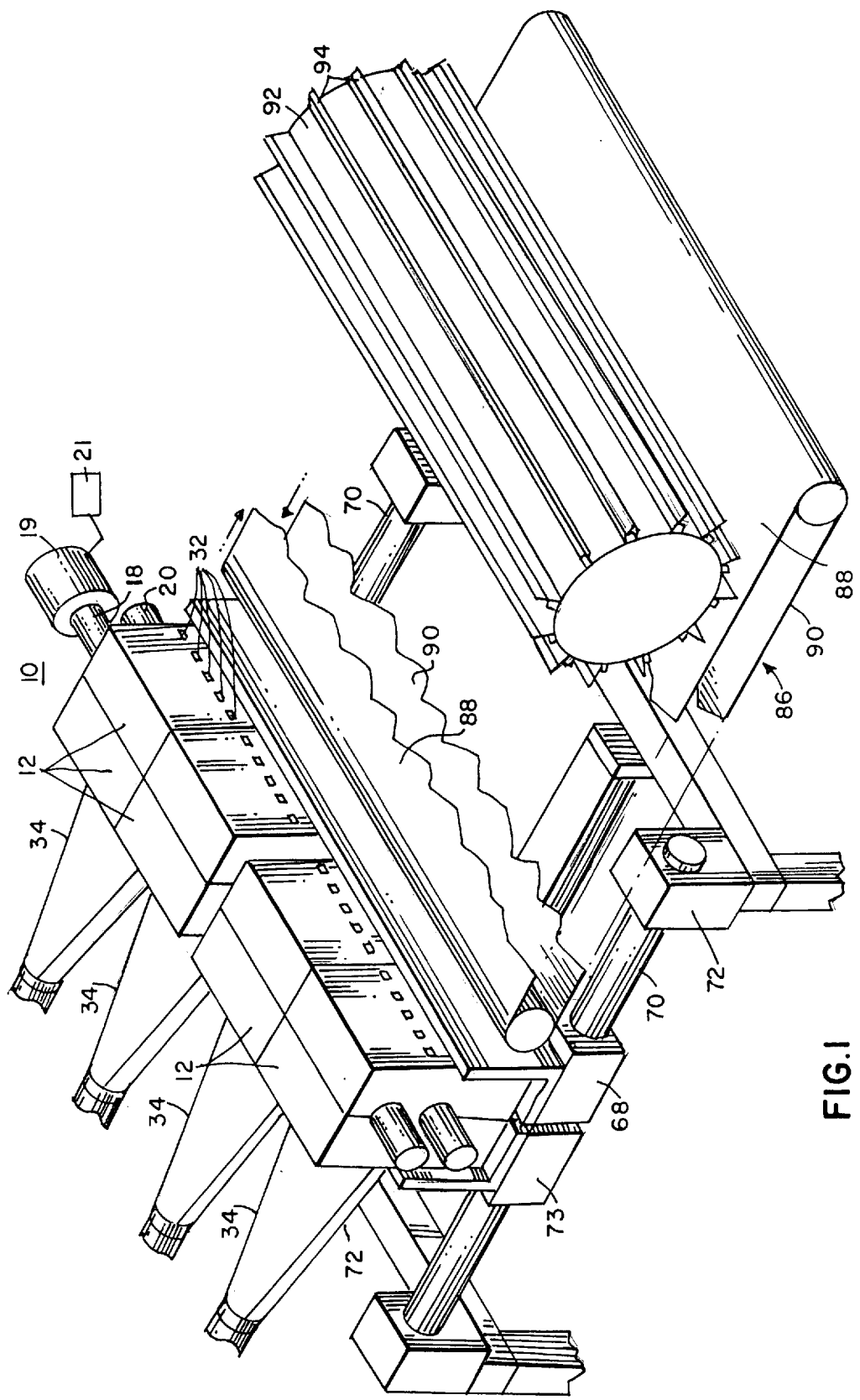
FIG. 1 is a perspective view of a portion of the foodstuff processing assembly constructed according to the principles of the present invention.
Figure 2:
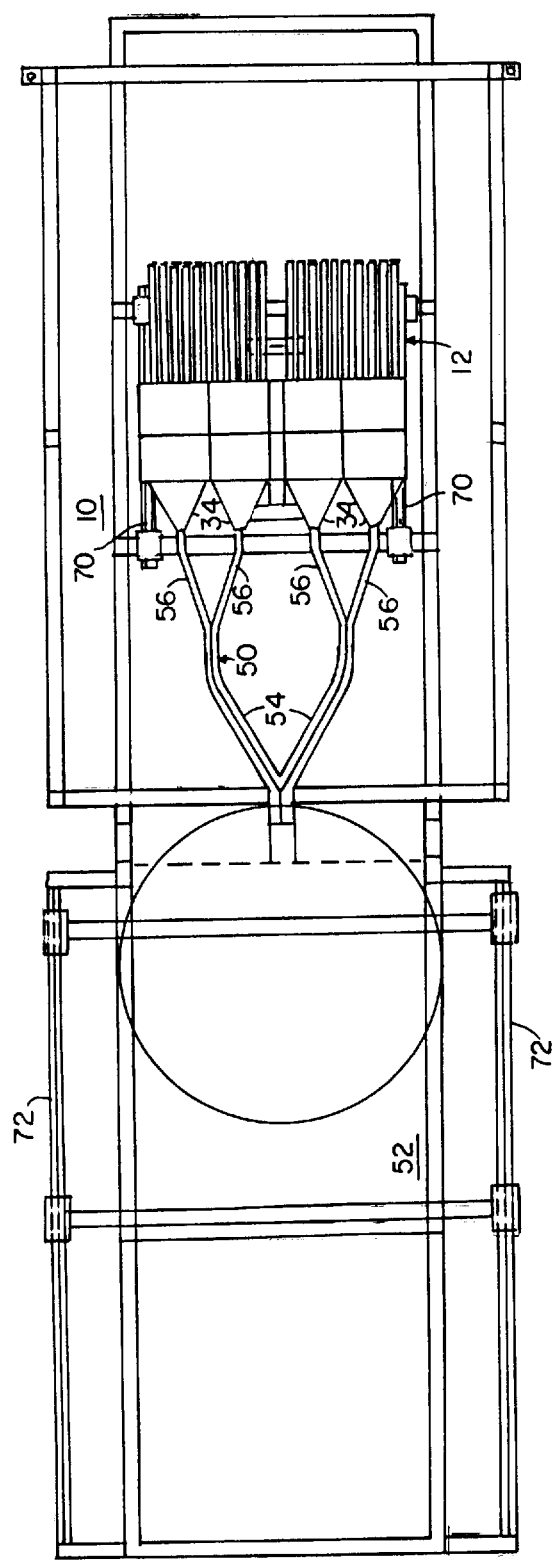
FIG. 2 is a plan view of a foodstuff processing assembly of the present invention.

Referring to the drawings in detail, there is shown the present invention which comprises a multiple pump arrangement for the processed extrusion of foodstuffs such as fish mash, or the like, as shown in FIGS. 1 and 2. The foodstuff processing arrangement 10 comprises a plurality of pumps 12 each mounted along side one another in a ganged fashion.

Figure 4:
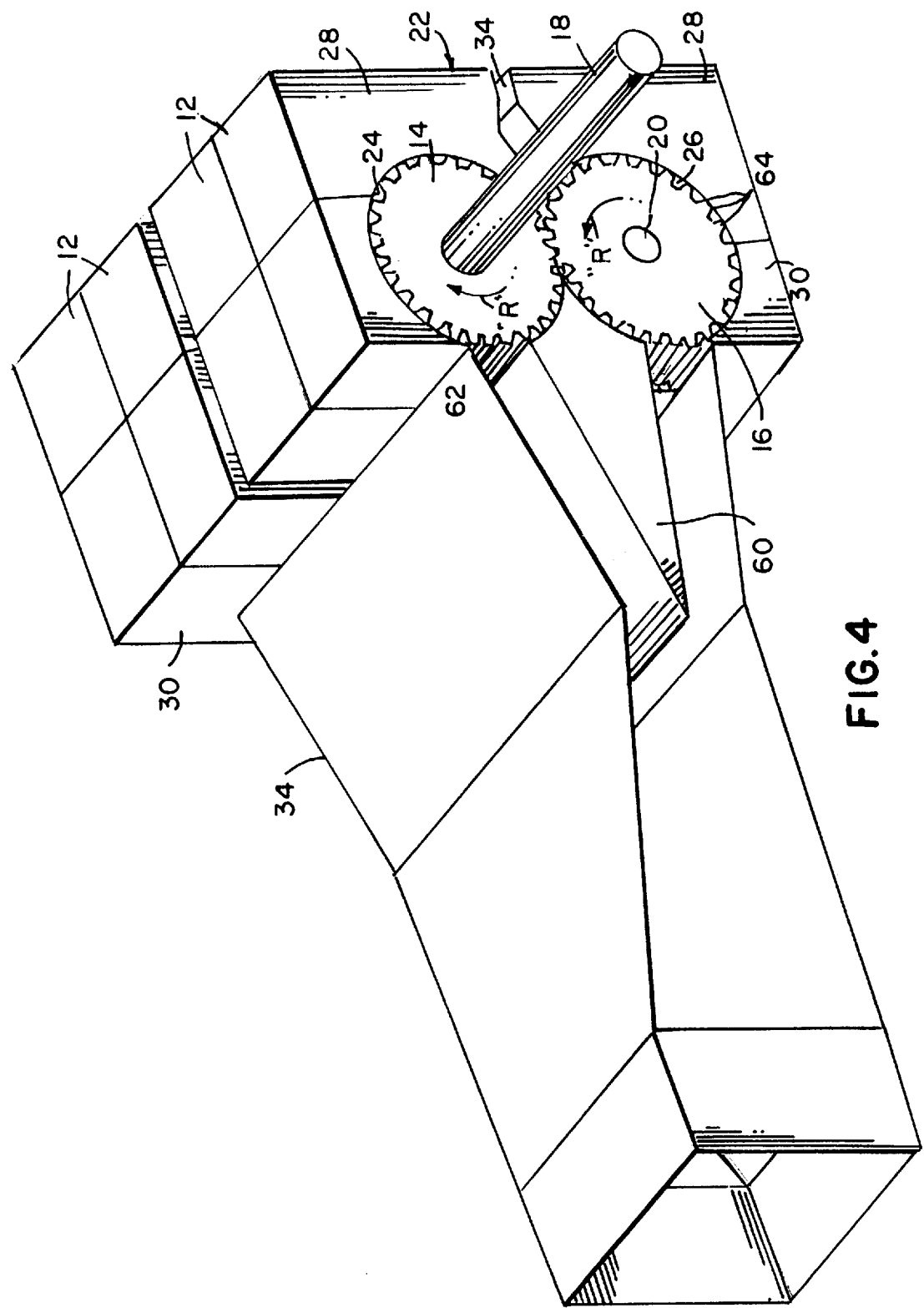
FIG. 4 is a perspective view of a conduit and divider arrangement shown feeding a plurality of gears in a split pump housing.
Figure 5:
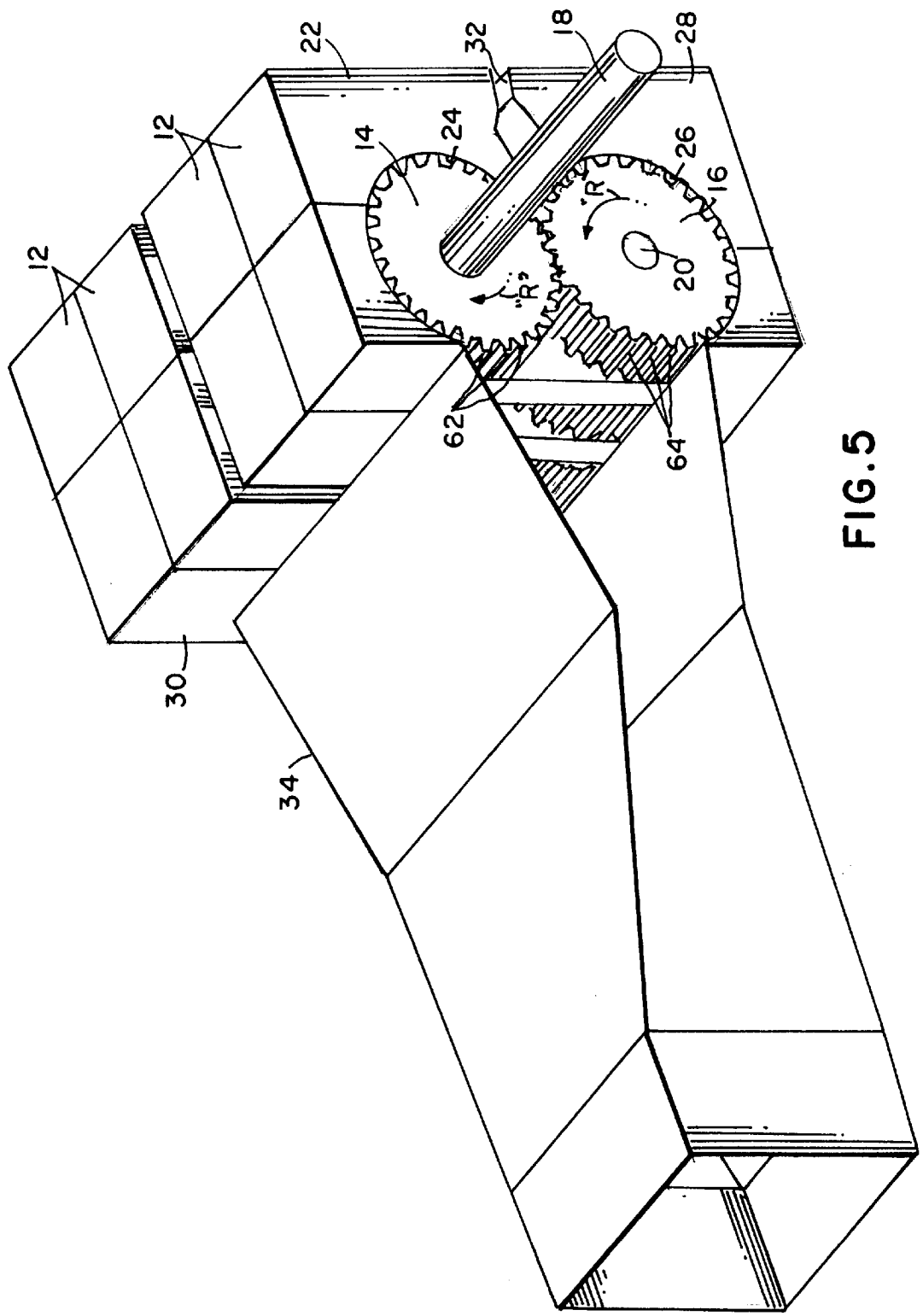
FIG. 5 is a view similar to that shown in FIG. 4 but with a different embodiment in its mesh feed conduit.

Each pump 12 comprises a first or upper rotatable gear 14 and a second or lower rotatable real 16, each upper gear 14 being mounted on a common horizontally disposed drive shaft 18 and each lower gear 16 being disposed on a common lower shaft 20, as shown in FIGS. 4 and 5. The upper drive shaft 18 drives both sets of gears 14 and 16 by virtue of their mating rotative interengagement. The upper drive shaft 18 is rotatively connected to a single drive motor 19, operated and controlled by a proper control unit 21. By virtue of the single empowerment and common drive shaft turning all the pumps 12, there is a common uniformity to the extruded foodstuff along the entire system 10. Each set of gears 14 and 16 disposed on those upper and lower shafts 18 and 20, of that system 10, are all rotatably supportively disposed within a split pump housing 22, as may be seen in FIGS. 4 and 5.

The split pump housing 22 comprises a generally cylindrically shaped upper chamber 24 through which the upper drive shaft 18 and upper gears 14 are located in a close fitting relationship. The lower gears 16 are correspondingly located in a lower generally cylindrically shaped chamber 26 within the lower portion of the split pump housing 22, in a close fitting relationship therewith. The split pump housing 22 has a forward portion 28 and a rearward portion 30, which when joined together define those cylindrically shaped chambers 24 and 26 which enclose the rotatably supportive gears 14 and 16 therewithin.

The forward portion 28 of the split pump housing 22 has a plurality of discharge nozzles 32 spaced thereacross, as may be seen in FIGS. 1, 4 and 5. There is at least one nozzle 32 for each combination of upper and lower gear arrangements 14 and 16. In the rearward side 30 of the split pump housing 22, there is a mash feed conduit 34 in fluid communication with the upper and lower chambers 24 and 26. The mash feed conduit 34 acts as a supply channel for several pairs of upper and lower gear arrangements 14 and 16 which carry the mash feed from the conduit 34, between their adjacent teeth, pumping the mash feed out through each respective extrusion nozzle 32 on the front or forward portion 28 of the split pump housing, as the teeth mesh, upstream of the nozzles 32.

Figure 3:
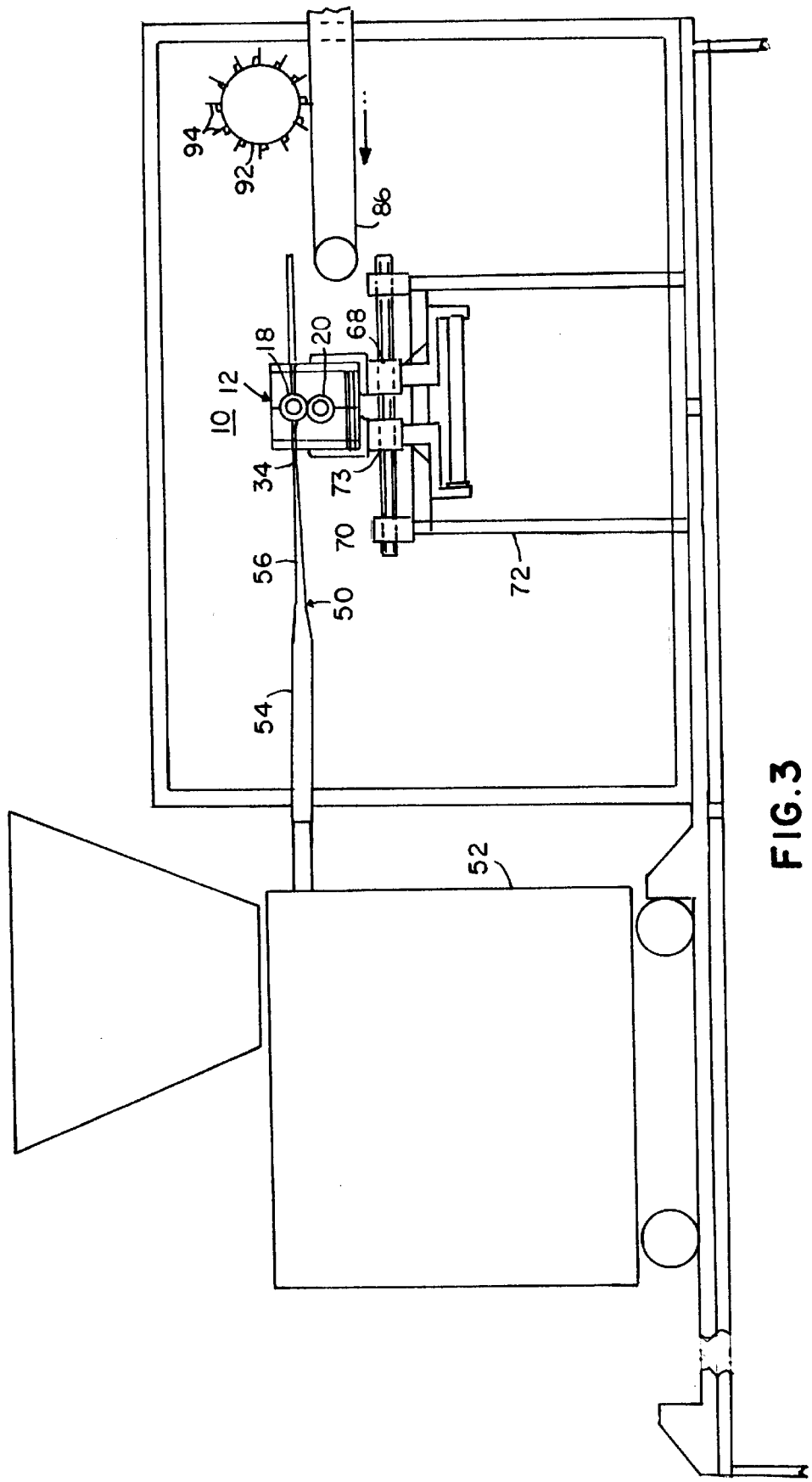
FIG. 3 is a side elevational view of a foodstuff processing assembly of the present invention.

Each mash feed conduit 34 is supplied by a mash feed manifold 50, which manifold 50 is in communication with a pressurized foodstuff containment chamber 52, as shown in FIGS. 2 and 3. The pressurized foodstuff containment chamber 52 causes foodstuff to be pressed through a plurality of conduits 54 comprising the manifold 50, which manifold 50 again splits into further conduits 56 each conduit 56 supplying a mash feed conduit 34 as discussed hereinabove.

Figure 6:
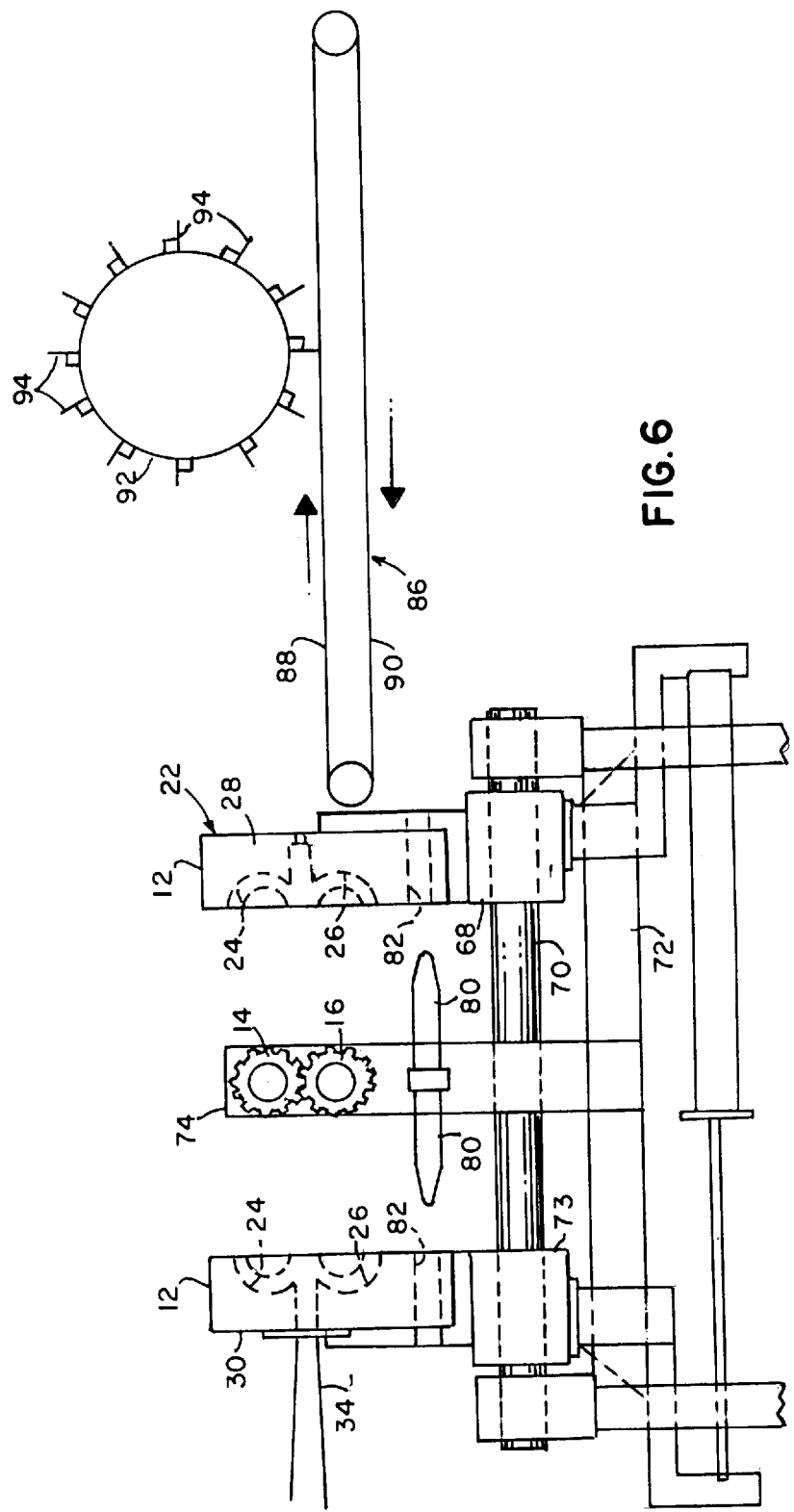
FIG. 6 is a side elevational view of the split pump housing separated from one another to display how the system may be cleaned and/or repaired.

In one embodiment of the present invention as shown in FIG. 4, a flow divider 60 is disposed within the mash feed conduit 34, so as to split the mash feed foodstuff onto the outer peripheral teeth 62 and 64 of the upper end the lower gears 14 and 16 respectively. As the meshing gears 14 and 16 rotate, as shown by the arrows "R" in FIGS. 4 and 5, they carry the foodstuff with them between the adjacent teeth 62 and 64 of the respective gears 14 and 16. As the teeth 62 and 64 rotate through an arc of about 270 degrees, after picking up the foodstuff from the feed conduit 34, they then mesh and thus force the foodstuff out from between the meshing teeth 62 and 64, and then out the nozzle 32 thereadjacent. One aspect of the present invention comprises the split pump housing 22, having its forward portions 28 being mounted on a bushing 68 at each lower end thereof, as shown in FIGS. 1, 3 and 6, each bushing 68 being mounted on a horizontally disposed support shaft 70, on the frame 72 of the foodstuff processing assembly 10.

The rearward portion 30 of the split pump housing 22 is similarly supported by a lowermost support bushing 73 at each end thereof, on the same horizontally disposed support shaft 70. The upper and lower gang of gears 14 and 16, being the primary driving mechanism for the foodstuff ejected from each respective nozzle 32, is independently supported on their common upper drive shaft 18 and lower drive shaft 20 by spaced apart support columns 74, (only the rear support being shown for clarity of viewing, in FIG. 6), attached to the frame assembly, each shaft 18 and 20 being rotatably journalled thereon, being controlled and empowered by a common motive source 19, as shown in FIG. 1.

By virtue of their sepal ability of the forward and rearward portions 28 and 30 of the split pump housing 22, the upper and lower chambers 24 and 26 of each pump portion 12 may be inspected and readily cleaned, as well as the upper and lower intermeshing gears 14 and 16 including the nozzles 32 which extrude the foodstuff itself. As shown in FIG. 6, alignment pins 82 are disposed on the support columns 74 for the upper and lower shafts 18 and 20, to each mate with a corresponding alignment hole 82 in the adjacent faces of the forward and rearward portions 28 and 30 of the split pump housing 22, to ensure proper alignment when the split pump housing 22 is reassembled into one mating unit.

The nozzles 32 discharge the extrudate foodstuff onto a moving conveyor belt 86, supported downstream of the split pump housing assembly 22. The conveyor belt 86 may be chilled by a refrigerant or cold air discharge between the upper and lower surfaces of the belt 88 and 90, or by a cooling jet of air upon the extrudate as it is deposited upon the moving belt 86.

A cylindrically shaped rotatable cutting drum 92 may be disposed downstream of the discharge nozzle arrangement 32, over a portion of the conveyor belt 86 The drum 92 preferably has a plurality of radially directed knife blades 94 extending therefrom. Each knife blade 94 is spaced a specific arcuate or circumferential distance from its adjacent neighboring knife blade 94, so as to cut into finite length the streams of foodstuff extrudate passing on the conveyor belt 86 therebeneath.

Thus the subsequent synchronized pumping by a plurality of pumps empowered by a single common motive drive of such foodstuffs such as a fish mash, ground meat, potato or dough, from a pressurized containment vessel 52 through a conduit arrangement 54, 56 and 34, permits a uniform discharge of material through a corresponding nozzle arrangement 32, thereby permitting a homogeneous and uniform presentation of foodstuff extruded onto a moveable conveyor belt 86 thereadjacent. It is also contemplated in a further embodiment, wherein each individual pump arrangement could be individually motorized, but that each such motive drive would be controlled by a single motor control unit.

We claim:

1. A foodstuff processing pump assembly apparatus for the continuous uniform discharge of a foodstuff onto a moveable conveyor belt comprising:

a support frame for supportively holding said pump assembly;

a plurality of pump housing portions disposed transversely with respect to said conveyor belt;

an upper drive shift rotatably empowering a pumping mechanism within each of said pump housing portions;

a lower support shaft rotatably empowering a corresponding lower array of pumping mechanisms within said pump housing portions;

a common supply manifold in fluid communication with each of a plurality of input chambers in said pump housing portions;

a plurality of nozzles disposed in a forward portion of each of said pump housing portions and a pressurized foodstuff containment vessel in communication through said supply manifold, with said input chambers feeding said pump assembly, such a pressurized ducting and pump combination arranged so as to provide a commonly powered array of uniform food extrusion streams onto said conveyor belt moving thereadjacent.

2. The foodstuff processing pump assembly apparatus as recited in claim 1, wherein each of said pump housing portions are splittable into a forward portion and a rearward portion, each portion being displaceable from one another so as to open and expose the upper and lower pumping mechanisms therewithin.

3. The foodstuff processing pump assembly apparatus as recited in claim 2, wherein each of said forward and rearward portions has a pair of internal cylindrically shaped chambers in which each of said upper and lower pumping mechanisms respectively, rotate, said input manifold and input chambers being in communication with said upper and lower chambers, and with said nozzles in said forward portions of said split pump housing portions.

4. The foodstuff processing pump assembly apparatus as recited in claim 3, wherein each pair of upper and lower pumping mechanisms are both in fluid communication with a single nozzle in said housing.

5. The foodstuff processing pump assembly apparatus as recited in claim 4, wherein each of said forward and rearward housing portions are slidably disposed on a pair of horizontally arranged support bars.

6. The foodstuff processing pump assembly apparatus as recited in claim 4, wherein said foodstuff extruded from said nozzles are driven therefrom by the combination of backup pressure from said foodstuff containment vessel and from meshing of said upper and lower pumping mechanisms downstreamedly adjacent said nozzles.

7. The foodstuff processing pump assembly apparatus as recited in claim 6, wherein said pumping mechanisms are rotatable meshing gears that squeeze said foodstuff out said nozzles when said gears rotatively intermesh.

8. The foodstuff processing pump assembly apparatus as recited in claim 4, wherein said input chambers have a flow divider arranged therewithin, so as to divide up the flow of foodstuff being pressurizedly provided to each of said pair of upper and lower pumping mechanisms.

9. A foodstuff processing pump assembly apparatus for the uniform and continuous discharge of a foodstuff from a plurality of nozzles, comprising:

a frame supporting a plurality of foodstuff pumps;

a common drive shaft for empowering each of said plurality of pumps;

a motor unit for empowering said common drive shaft;

a manifold for supplying said pumps with foodstuff for subsequent pumping thereof;

a pressurized foodstuff source in communication with said pumps through said manifold, to supply foodstuffs under pressure to said plurality of pumps, to permit foodstuffs to be uniformly extruded from said pumps through said plurality of nozzles.

10. The foodstuff pump assembly apparatus as recited in claim 9, wherein each of said pumps has a nozzle in downstream communication therewith, to extrude foodstuff therefrom.

11. The foodstuff pump assembly apparatus as recited in claim 9, wherein each of said pumps are Supported in a housing, said housing being splittable so as to permit access therewithin, and cleaning said pumps.

12. The foodstuff pump assembly apparatus as recited in claim 9, wherein a conveyor belt is arranged beneath said nozzles for receipt of extruded foodstuff thereon.

13. The foodstuff pump assembly apparatus as recited in claim 12, wherein a cutting mechanism is supported over said conveyor belt to cut said foodstuff extruded thereon into shorter segments.

14. A method of extruding a plurality of uniform, consistent elongated lines of foodstuff onto a conveyor belt, comprising the steps of:

supporting a plurality of pump members on a frame adjacent said conveyor belt;

arranging at least one nozzle in a housing of each of said pump members from which to discharge said foodstuff;

empowering each of said pump members by a common drive mechanism;

supplying each of said pump members with a manifold in communication with a foodstuff source; and extruding a plurality of uniform, consistent elongated lines of foodstuff from said pump members through the nozzles onto said conveyor belt.

15. The method of claim 14, including the step of:

pressurizing said foodstuff source so as to supply foodstuff to said pump members through said manifold under a common uniform pressure.

16. The method of claim 15, including the step of:

opening a middle portion of said housing of said pump members to permit the cleaning and repair of said common drive mechanism and any internal components therein.

* * * * *